No. 810,460. PATENTED JAN. 23, 1906.
F. H. BLACKBURN.
MACHINE FOR MAKING AIR HOLE GLASSWARE.
APPLICATION FILED FEB. 24, 1905.

Witnesses.
E. B. Gilchrist
J. Kohn

Inventor
Frank H. Blackburn,
By his Attorneys
Thurston & Bates

UNITED STATES PATENT OFFICE.

FRANK H. BLACKBURN, OF FOSTORIA, OHIO, ASSIGNOR TO THE NATIONAL ELECTRIC LAMP COMPANY, OF CLEVELAND, OHIO, A CORPORATION OF NEW JERSEY.

MACHINE FOR MAKING AIR-HOLE GLASSWARE.

No. 810,460.    Specification of Letters Patent.    Patented Jan. 23, 1906.

Application filed February 24, 1905. Serial No. 247,161.

*To all whom it may concern:*

Be it known that I, FRANK H. BLACKBURN, a citizen of the United States, residing at Fostoria, in the county of Seneca and State of Ohio, have invented a certain new and useful Improvement in Machines for Making Air-Hole Glassware, of which the following is a full, clear, and exact description, reference being had to the accompanying drawings.

The object of this invention is to provide a simple rapidly-operating machine for making the holes in air-hole glassware. In such ware, which is used on Welsbach lights and other places, it is customary to have a number of air-holes made into an annular bead, which is formed near the base of the globe. Heretofore these holes have been made one at a time by hand by heating the spot on the bead where the hole is to be and then touching to it the end of a heated iron or glass rod, to which the glass adheres and which is then drawn away from the globe to make an attenuated conical projection or horn, which is then broken off to leave the hole.

My machine mechanically draws out the horns from the globe to make all of the holes at once. The invention comprises, broadly, the combination of means for holding the globe and mechanism for engaging it at various heated points and then drawing away to form the horns. The more particular embodiment of the invention herein shown and hereinafter more fully explained is also comprised within my invention.

Figure 1:
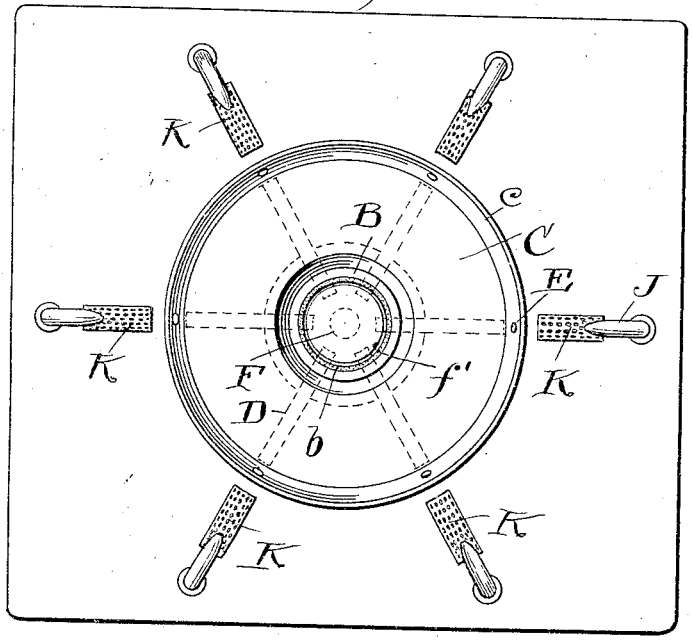
Figure 2:
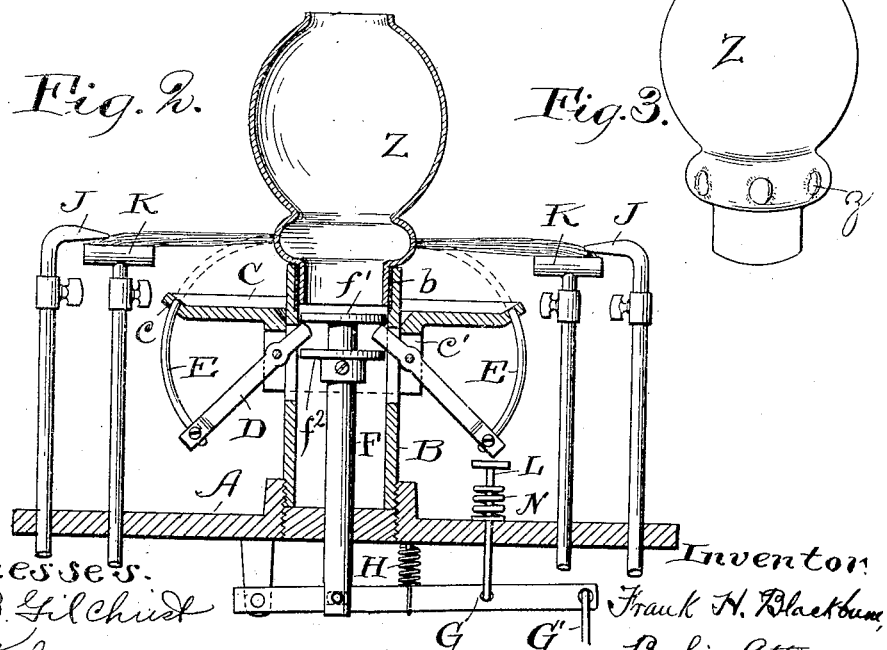
Figure 3:
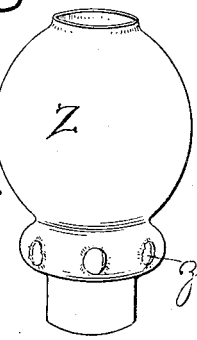

In the drawings, Figure 1 is a plan of my machine. Fig. 2 is a vertical section thereof. Fig. 3 is a perspective view of air-hole glassware as produced by the machine.

Referring to the parts by letters, A represents a suitable bed-plate, from the center of which rises a tubular standard B. In the upper end of this standard rests the glassware to be treated, (indicated by Z.) Secured to the standard is a disk C, having at its edge an upwardly-inclined flange $c$. Pivoted in slots formed through the standard B and the hub $c'$ of the disk are a series of levers D. There are as many of these levers as there are holes to be made in the glassware—six, for example. Secured to the outer end of each lever is a curved rod E, the upper end of which normally lies in a hole in the disk C.

The rods E are of such length that when they are moved into their uppermost position their ends strike the sides of the globe, as indicated by dotted lines in Fig. 2. To so move them, I provide within the standard B a rod F, having a pair of collars $f'$ and $f^2$, between which take the inner ends of the levers D. The lower end of the rod F is connected to a lever G, which will be operated in suitable manner, as by a treadle, (not shown,) connected with the lever by a link G'. A spring H serves to keep the rod F elevated, and hence the rods E depressed.

J represents air-nozzles pointing toward the globe and K gas-burners beneath the air-nozzles and across which the air blows, directing each flame in a point against the glassware on the spot which the upper end of the rod E is adapted to strike.

The rods E should be heated before they strike the globe, and to accomplish this I cause the rods when the treadle is depressed to pause with the upper ends in the path of the flames, after which a completion of the depression of the treadle moves the rods to impinge the globe. To cause the temporary cessation of the movement of the rods, I provide a bar L, secured to the lever G and playing idly through the frame A and through a coiled spring N. When the upper end of the bar strikes the spring, the operator feels the increased resistance and stops depressing the treadle. Then after the ends of the rods E have become heated the depression is completed.

As the heated rods impinge on the globe the glass adheres to their ends. Then the treadle is released, and the spring H, forcing up rod F, draws down the rods E. In this movement each rod E draws a horn out of the globe. These horns are so thin that a slight blow shatters them, and the globe is left with the holes in it, needing only grinding and glazing to complete them.

The upper ends of rods E as they return to normal position recede slightly into the holes in the flange C, and this clears them from whatever glass is sticking to them.

I claim—

1. In a machine for making air-hole glassware, the combination of means for holding the material, means for heating it in spots, and mechanism for engaging the material at such spots and then receding therefrom to draw out projections from the material.

2. In a machine for making air-hole glassware, the combination of means for holding the material, means for heating the same, in a plurality of places, members for simultaneously engaging the material at such plurality of places, and means for moving said members away from the body of the material.

3. In a machine for making air-hole glassware, the combination of a central support, a plurality of rods placed about the axis of the support and adapted to engage the globe at several points, means for heating the globe, means for simultaneously moving said rods toward the globe to strike it at the heated spots without puncturing the glass and for then retracting the rods with the glass clinging thereto.

4. In a machine for making air-hole glassware, the combination of means for holding a globe, means for directing a series of flames radially against it to heat separated spots thereon, a series of rods, and mechanism for causing them to move against the heated spots on the globe and then retreat.

5. In a machine for making air-hole glassware, the combination of a central support adapted to hold a globe, a series of rods arranged about the support and guided to move against the globe, means for so moving the rods and for causing them to move away from the globe, and means for heating the globe and the ends of the rods before they engage the globe.

6. In a machine for making air-hole glassware, the combination of a support for the globe, a series of gas-burners and air-jets arranged radially about the globe, a series of rods and mechanism for simultaneously moving them to engage the globe at the heated spots and for then moving them away from the globe to draw out horns from it.

7. In a machine for making air-hole glassware, the combination of a support for the globe, a series of heating members therefor, a series of rods, mechanism for simultaneously moving them to engage the globe at the heated spots and for then moving them away from the globe to draw out horns, and means for clearing the ends of the rods from glass tending to adhere thereto.

8. In a machine for making air-hole glassware, the combination of a support for the globe, means for directing a series of flames against the globe, a series of arc-shaped members located radially of the glassware, and means for swinging said members upward in vertical planes about the centers of their arcs to engage the glassware.

9. In a machine for making air-hole glassware, the combination of means for holding a globe, means for directing a series of flames radially against it, a series of rods, mechanism for causing them to move against the heated spots on the globe and then retreat, and means for causing said rods to pause during their forward movement with their forward ends in the flames whereby said ends become heated.

10. In a machine for making air-hole glassware, the combination of a tubular support for the globe, means for directing a series of flames against the globe, a series of levers pivotally carried by said support, a common operating-rod within said support and operatively connected with the inner ends of said levers, and rods operated by said levers and adapted to move against the globe and then away from it.

11. In a machine for making air-hole glassware, the combination of a support for the glassware, means for directing a series of flames against the glassware, a series of arc-shaped rods located about the glassware, means for swinging said rods about the centers of their arcs to engage the glassware, and a disk carried by the supports and having a series of openings guiding said rods.

In testimony whereof I hereunto affix my signature in the presence of two witnesses.

FRANK H. BLACKBURN.

Witnesses:
H. S. BLACK,
F. C. MAXHEIMER.